US008799554B1

(12) United States Patent
Vincent et al.

(10) Patent No.: US 8,799,554 B1
(45) Date of Patent: Aug. 5, 2014

(54) METHODS AND SYSTEM FOR SWAPPING MEMORY IN A VIRTUAL MACHINE ENVIRONMENT

(75) Inventors: Pradeep Vincent, Issaquah, WA (US); William Lewis, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 169 days.

(21) Appl. No.: 12/913,707

(22) Filed: Oct. 27, 2010

(51) Int. Cl.
*G06F 13/00* (2006.01)
*G06F 13/28* (2006.01)

(52) U.S. Cl.
USPC ......... 711/6; 711/137; 711/E12.023; 718/107

(58) Field of Classification Search
USPC ................ 711/6, 137, E12.023; 718/107
See application file for complete search history.

(56) References Cited

U.S. PATENT DOCUMENTS

| | | | | |
|---|---|---|---|---|
| 2004/0268347 | A1* | 12/2004 | Knauerhase et al. | 718/1 |
| 2005/0132363 | A1* | 6/2005 | Tewari et al. | 718/1 |
| 2010/0306770 | A1* | 12/2010 | Frank | 718/1 |
| 2012/0011504 | A1* | 1/2012 | Ahmad et al. | 718/1 |
| 2012/0072906 | A1* | 3/2012 | Tsirkin et al. | 718/1 |

OTHER PUBLICATIONS

How the 'Net works: An Introduction to Peering and Transit; Rudolph van der Berg; dated Sep. 2, 2008.
VL2: A Scalable and Flexible Data Center Network; Albert Greenberg, et al.; dated Aug. 2009.
Cisco Policy Based Routing White Paper; accessed Jun. 7, 2010.
Internet Security Systems, Distributed Denial of Service Attack Tools; accessed Jun. 7, 2010.
B. Pfaff, et al., Extending Networking into the Virtualization Layer, Proceedings of the 8th ACM Workshop on Hot Topics in Networks (HotNets—VIII), New York City, New York (Oct. 2009).
A. Greenberg, et al., Towards a Next Generation Data Center Architecture: Scalability and Commoditization, dated Aug. 22, 2008.
P. J. Denning, Virtual Memory, Computing Surveys, vol. 2, No. 3, dated Sep. 1970.
J. E. Smith, et al., Virtual Machines: Architectures, Implementations and Applications, HOTCIPS 17, Tutorial 1, Part 2, dated Aug. 14, 2005.
P. Barham, et al., Xen and the Art of Virtualization, SOSP'03, Oct. 19-22, 2003.

* cited by examiner

*Primary Examiner* — Edward Dudek, Jr.
(74) *Attorney, Agent, or Firm* — Knobbe, Martens, Olson & Bear, LLP

(57) ABSTRACT

In this disclosure, techniques are described for more efficiently sharing resources across multiple virtual machine instances. For example, techniques are disclosed for allowing additional virtual machine instances to be supported by a single computing system by more efficiently allocating memory to virtual machine instances by providing page swapping in a virtualized environment and/or predictive page swapping. In one embodiment, a virtual memory manager swaps pages predicatively in and/or out of a paging pool based on information from a central processing unit ("CPU") scheduler. In one embodiment, the CPU scheduler provides scheduling information for virtual machine instances to the virtual memory manager, where the scheduling information allows the virtual memory manager to determine when a virtual machine is scheduled to become active or inactive. The virtual memory manager can then swap-in or swap-out memory pages.

33 Claims, 6 Drawing Sheets

METHODS AND SYSTEM FOR SWAPPING MEMORY IN A VIRTUAL MACHINE ENVIRONMENT

BACKGROUND

Computers may emulate hardware to provide the appearance of hardware that does not actually exist to an operating system, application, logic, or process. Computers may also use emulation to partition one hardware function between multiple operating systems, applications, and so on. This emulation may also be referred to as virtualization.

Virtualization may be accomplished by mechanisms including, for example, pure software virtualization, hardware supported software virtualization, and the like. Software virtualization facilitates emulating hardware on a variety of processors, particularly if the virtualization code is written in a portable, structured manner. Hardware virtualization may require hardware functions to be designed into an underlying chip With the introduction of virtualization technology, a computing service provider can now provide computing resources to customers dynamically and/or in a scalable manner. As the computing resource demands of the customer increase, the computing service provider can allocate additional computing resources in the form of virtual machine instances. For example, such resources can be provided to the customer as part of a virtual network connectable to the customer's own physical network.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Figure 1:
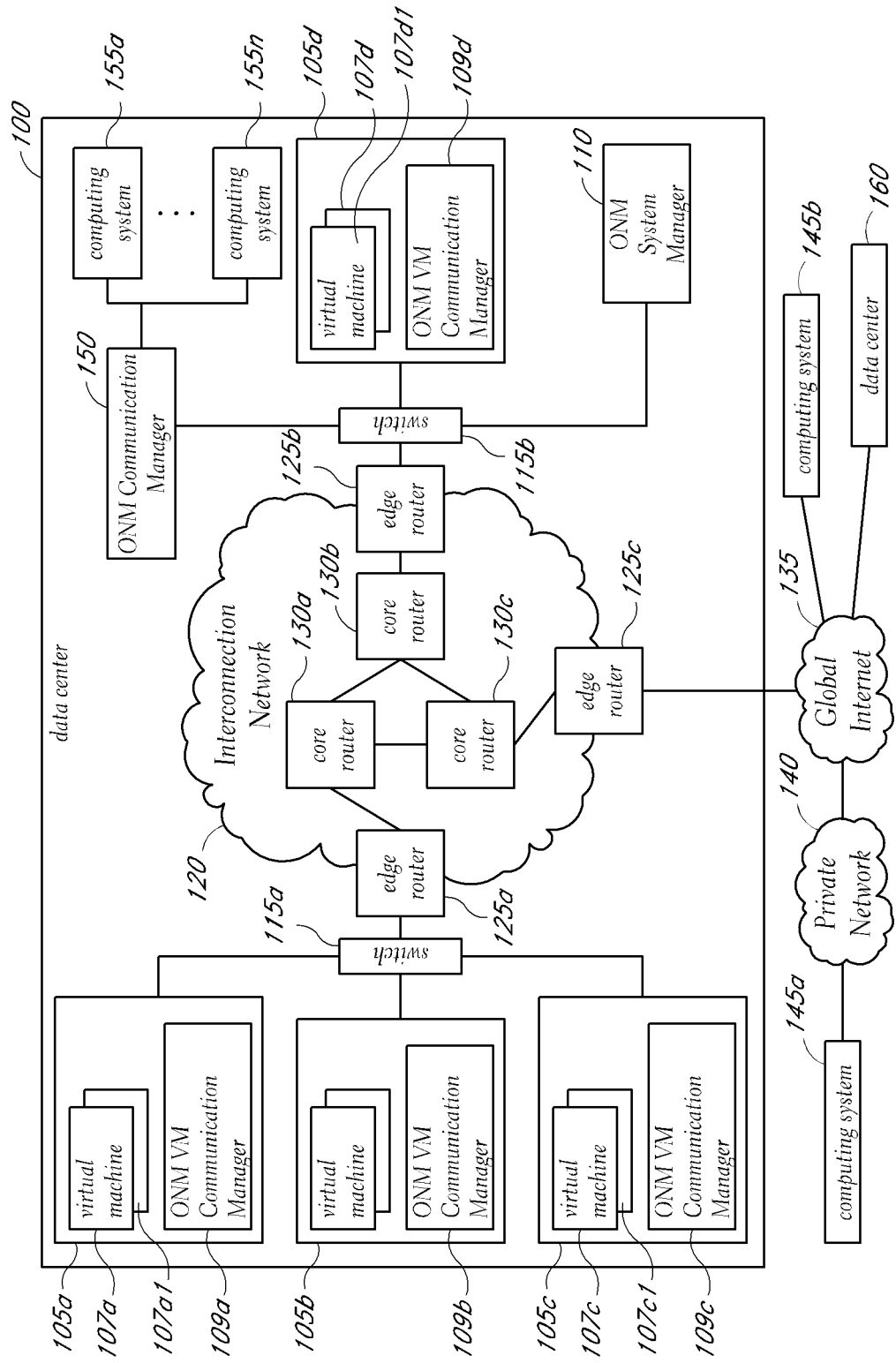
FIG. 1 is a network diagram illustrating an embodiment of an overlay network manager ("ONM") system for managing computing nodes associated with a virtual computer network.

With the advent of virtualization technologies the same physical computing resource can be shared transparently by multiple users. Virtualization allows the shared computing resource to appear to be solely under each user's control while in actuality, the computing resource may be operating multiple virtual machine instances at a time. For example, virtualization technologies such as those provided by VMware, XEN, or User-Mode Linux can be adapted to allow a single physical computing machine to be shared among multiple virtual networks by providing one or more virtual machine instances simulated in software by the single physical computing machine, with each virtual machine acting as a distinct logical computing system. These virtualized environments take advantage of the fact that most computing resources are underutilized most of the time.

Typically, the number of virtual machine instances supportable by a computing system is limited by, among other things, the amount of physical main memory available. Too many virtual machine instances can lead to memory thrashing, in which the computer spends a disproportionate amount of its capacity swapping pages to and from a backing store and therefore performing useful work more slowly. One solution is to add additional physical memory, but this increases the cost of the computing system. Another solution is to enhance the efficiency of memory use, such that greater numbers of virtual machine instances can be supported with the same amount of physical main memory, for example, by providing a virtual memory system for virtualized environments. Further, in one embodiment, the virtual memory system can implement predictive swapping based on central processing unit ("CPU") scheduling information for the virtual machine instances in order to enhance memory usage efficiency.

While virtual memory systems for physical computing systems exist, swapping is generally not preferred in virtualized environments for several reasons. First, as hard drive latencies are generally in the order of, more or less, 10s of milliseconds while typical memory fetch is generally in the order of, more or less, 100s of nanoseconds, page swapping in the virtualized environment could cause significant performance issues. Second, on-demand paging, by definition, forces the thread/process/virtual machine instance that needs the swapped memory to wait for the 'reload' of swapped memory from hard drives. Finally, implementing swapping at the virtualized layer can be counterproductive if the virtual machine instance implements its own virtual memory system that may swap the same memory pages that the virtualized environment swaps. However, the disclosure below seeks to address those issues.

In this disclosure, techniques are described for more efficiently sharing resources across multiple virtual machine instances. For example, techniques are disclosed for allowing additional virtual machine instances to be supported by a single computing system by more efficiently allocating memory to virtual machine instances by providing page swapping in a virtualized environment and/or predictive page swapping. In one embodiment, a virtual memory manager swaps pages predicatively in and/or out of a paging pool based on information from the a CPU scheduler. In one embodiment, the CPU scheduler provides scheduling information for virtual machine instances to the virtual memory manager, where the scheduling information allows the virtual memory manager to determine when a virtual machine is scheduled to become active or inactive. The virtual memory manager can then swap-in or swap-out memory pages.

By way of overview, FIG. 1 illustrates an embodiment of an overlay network manager system where physical computing systems can operate multiple virtual machine instances transparently. FIGS. 2-6 discuss embodiments of computing systems and processes supporting efficient memory management of paging systems for virtualized environments.

Overlay Network Manager

FIG. 1 is a network diagram illustrating an embodiment of an overlay network manager system ("ONM") for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135 external to the data center 100. The global internet can provide access to one or more computing systems 145a via private network 140, to one or more other globally accessible data centers 160 that each have multiple computing systems, and to one or more other computing systems 145b. The global internet 135 can be a publicly accessible network of networks, such as the Internet, and the private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems to manage communications for the associated computing systems 155a-155n. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machine instances 107a on host computing system 105a, and VM Communication Manager module 109d and virtual machine instances 107d on host computing system 105d. Physical computing systems 155a-155n do not execute any virtual machine instances in this example, and thus can each act as a computing node that directly executes one or more software programs on behalf of a user. The Communication Manager module 150 that manages communications for the associated computing systems 155a-155n can have various forms, such as, for example, a proxy computing device, firewall device, or networking device (e.g., a switch, router, hub, etc.) through which communications to and from the physical computing systems travel. In other embodiments, all or none of the physical computing systems at the data center host virtual machine instances.

This example data center 100 further includes multiple physical networking devices, such as switches 115a-115b, edge router devices 125a-125c, and core router devices 130a-130c. The physical sub-networks established by switches 115a-115b, in turn, are connected to each other and other networks (e.g., the global internet 135) via an intermediate interconnection network 120, which includes the edge routers 125a-125c and the core routers 130a-130c.

The System Manager module 110 and Communication Manager modules 109, 150 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network.

Further, the Communication Manager modules 109a and/or 109c on the host computing systems 105a and 105c can perform additional actions that correspond to one or more logical specified router devices lying between computing nodes 107a1 and 107c1 in the virtual network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network by using virtual machine instances.

Virtual Memory Management

Figure 2:
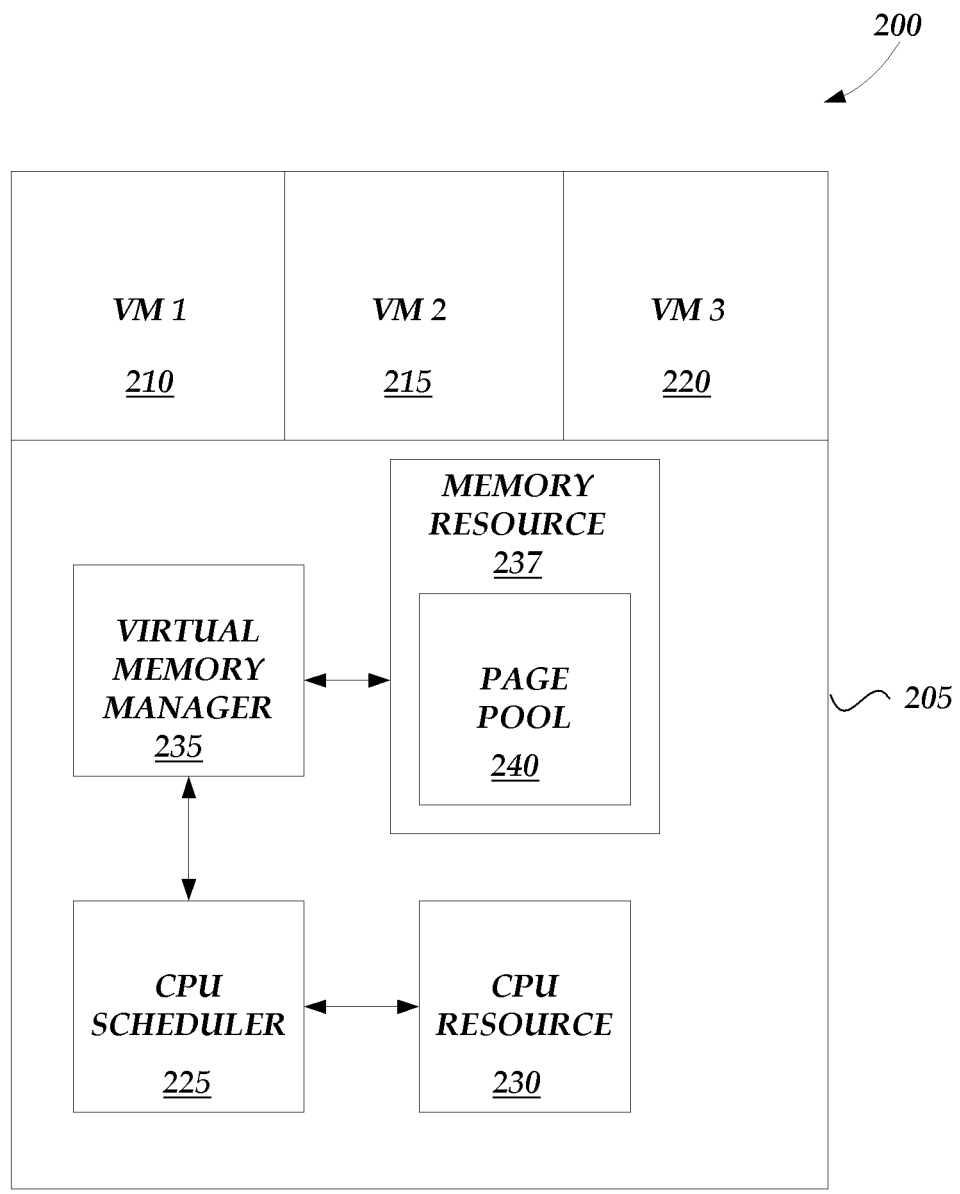
FIG. 2 illustrates an embodiment of a computing node for operating virtual machine instances, such as the computing nodes described above in FIG. 1.

FIG. 2 illustrates an embodiment of a computing node 200 for operating virtual machine instances, such as the computing nodes described above in FIG. 1. In one embodiment, a node manager 205 allows multiple operating systems to run concurrently on the computing node through hardware virtualization. The node manager can schedule across the physical CPU(s) of the computing node. The node manager may also present guest operating systems a virtual operating platform and monitors the execution of the guest operating systems. Multiple instances of a variety of operating systems operating on one or more virtual machine instances 210, 215, 220 may share the virtualized hardware resources. In one embodiment, the node manager comprises a hypervisor or virtual machine manager. The node manager may also comprise a first guest operating system or domain 0 (dom0), which may boot automatically when the hypervisor boots and receives management privileges and direct access to the physical hardware by default. The system administrator can use the node manager to manage guest operating systems or virtual machine instances.

In some embodiments, the node manager 205 comprises a CPU scheduler 225 that manages one or more CPU resources 230. The CPU scheduler allocates or assigns a CPU resource to a virtual machine instance 210, 215, and 220, allowing the virtual machine to operate for a particular time slice. The CPU scheduler can manage a scheduling queue of virtual machine instances waiting to receive a CPU resource. For example, the CPU scheduler may make scheduling decisions by selecting a virtual machine operates after a clock interrupt, an I/O interrupt, an operating system call or another form of signal. The CPU scheduler may or may not be able to forcibly remove a virtual machine from a CPU when it decides to allocate that CPU to another virtual machine. In one embodiment, the CPU scheduler allocates the computing resource to a virtual machine for a time slice, but removes the computing resource after the time slice ends.

In some embodiments, the node manager 205 may also comprise multiple schedulers, such as a long-term scheduler, mid-term scheduler, and/or a short-term scheduler. For example, the short-term scheduler may determine which of the ready, in-memory virtual machine instances are to be executed (e.g. allocated to a CPU), the mid-term scheduler may determine which virtual machines instances to swap in or swap out to secondary storage, while the long-term scheduler may determine which virtual machines instances to admit to a ready queue of virtual machines awaiting execution.

In some embodiments, the node manager 205 can implement hierarchal schedulers where multiple schedulers schedule different virtual machines based on characteristics of the virtual machines instances. Total available CPU time can be split between the schedulers. For example, virtual machine instances requiring short latencies can be handled by a high priority scheduler while latency tolerant virtual machines can be handled by a lower priority scheduler. Other characteristics such as length of running times or quality of service levels can also be used to assign virtual machines to different schedulers.

As discussed above, in some embodiments, the node manager 205 can comprise a hypervisor and a dom0. In one embodiment, the hypervisor comprises the CPU scheduler 225 while the dom0 comprises a virtual memory manager 235. Information about CPU scheduling is provided by the hypervisor to the dom0. However, other configurations are possible and the CPU scheduler and/or virtual memory manager 235 can reside in other components of the node manager 205.

The CPU scheduler 225 may allocate resources using one or more of a variety of scheduling algorithms. For example, the CPU scheduler may use first in first out (FIFO), where the scheduling queue is processed in the order that virtual machine instances arrive in the queue. Another scheduling algorithm is shortest remaining time where the CPU scheduler arranges virtual machine instances with the least estimated time remaining to be next in the scheduling queue. Another possible scheduling algorithm is fixed priority pre-emptive scheduling where the virtual machine instances are assigned a priority and allocated accordingly. In round-robin scheduling, the scheduler assigns a fixed time unit per virtual machine and cycles though the virtual machine instances. In multilevel queue scheduling, virtual machine instances are divided into different groups with different scheduling priorities where virtual machine instances in higher level queues are scheduled to operate first. Many other scheduling algorithms are available and can be used by the CPU scheduler.

In some embodiments, the node manager 205 comprises a virtual memory manager 235 that manages memory resource(s) 237, for example, through a page pool 240. Virtual memory systems separate the memory addresses used by a process or virtual machine from the actual physical addresses, allowing separation of processes or virtual machine instances and increasing the effectively available amount of memory resources (e.g. random access memory (RAM)) using disk swapping. Paging is one of the memory-management schemes by which a computer can store and retrieve data from secondary storage (e.g. hard drives, disk storage and/or solid state storage) for use in main memory (e.g. RAM). In the paging memory-management scheme, the operating system (e.g. dom0) retrieves data from secondary storage in same-size blocks called pages. One of the advantages of paging is that it allows the physical address space of a process to be noncontiguous. In one embodiment, the page pool 240 is a reserved block of RAM for paging. The virtual memory manager 235 may manage one or more page pools. In one embodiment, the virtual memory manager 235 is in communication with an I/O scheduler in order to receive information about storage drive operations and/or coordinate the loading of pages from a storage drive.

During paging in a virtualized environment, when a virtual machine tries to access pages that are not currently mapped to main memory, a page fault is generated. In one embodiment, the node manager 205 then takes control and handles the page fault, in a manner transparent to the virtual machine. The node manager 205 can then determine the location of the data in secondary storage, obtains an empty page frame in main memory to use as a container for the data, loads the requested data into the available page frame, updates the page table to show the new data, and/or returns control to the virtual machine, transparently retrying the instruction that caused the page fault. These above steps may be handled by a virtual memory manager 235 of the node manager 205.

Typically, because main memory is faster than secondary storage, paging is avoided until there is not enough main memory to store all the data requested. When this occurs, a page in main memory is moved to secondary storage or "swapped out", freeing up space in main memory for use. Thereafter, whenever the page in secondary storage is requested, a page in main memory is saved to secondary storage so that the requested page can then be loaded into the space left behind by the old page. Efficient paging systems determine the page to swap by choosing one that is least likely to be requested within a short time. There are various page replacement algorithms that try to do this, such as not recently used (NRU), first-in first out (FIFO), second-chance, clock, least recently used (LRU), not frequently used (NFU), aging, combinations/variations of the above, and/or the like. If a page in main memory is modified (e.g. if the page becomes dirty) and then chosen to be swapped, it can be written to secondary storage or discarded. To further increase responsiveness, paging systems may employ various strategies to predict what pages will be requested soon so that it can preemptively load them.

In some embodiments, demand paging may be used. In demand paging, paging occurs at the time of the data request, and not before. In particular, when a demand pager is used, a program or virtual machine usually begins execution with none of its pages pre-loaded in main memory. Pages are copied from the executable file into main memory the first time the executing code references them, usually in response to page faults. As such, much of the executable file might never be loaded into memory if pages of the program or virtual machine are never executed during that run. Potentially, the number of pages being swapped-in is reduced, thereby reducing the amount of memory used by the virtual machine, though the operation of the virtual machine may be slower due to the page faults.

In some embodiments, during a page fault, a virtual machine is put to "sleep" or deactivated by the CPU scheduler 225 until the requested page is available. The CPU scheduler 225 can communicate scheduling information about the virtual machine instance to the virtual memory manager 235, for example, by providing data on the next expected active time or the expected sleep time of the virtual machine. The virtual memory manager 235 can use the scheduling data to determine when to begin loading pages for the inactive virtual machine. Meanwhile, another virtual machine becomes active and begins executing.

In some embodiments, demand paging is used in combination with predictive swapping. One possible advantage of combining demand paging and predictive swapping is that the demand page loading can be delayed if advantageous. For example, if the next scheduled active time for the sleeping virtual machine instance is 100 milliseconds later, then rather than swap out a page now that may be referenced within the 100 milliseconds, the page can be swapped out when the time is closer to 100 milliseconds later, potentially saving two memory operations by avoiding a swap-out and later swap-in of the reference page.

In one embodiment, the virtual memory manager 235 is in communication with the CPU scheduler 225 and receives scheduling information from the CPU scheduler 225. For example, the virtual memory manager 235 can receive the queue order or order of operation of the virtual machine instances, an estimated run-time or starting time, an estimated sleep time or end time, the priority order of the virtual machine instances, and/or other scheduling information. Using the scheduling information, the virtual memory manager 235 can predict when a virtual machine is active or inactive and swap-in or swap-put pages.

Figure 3:
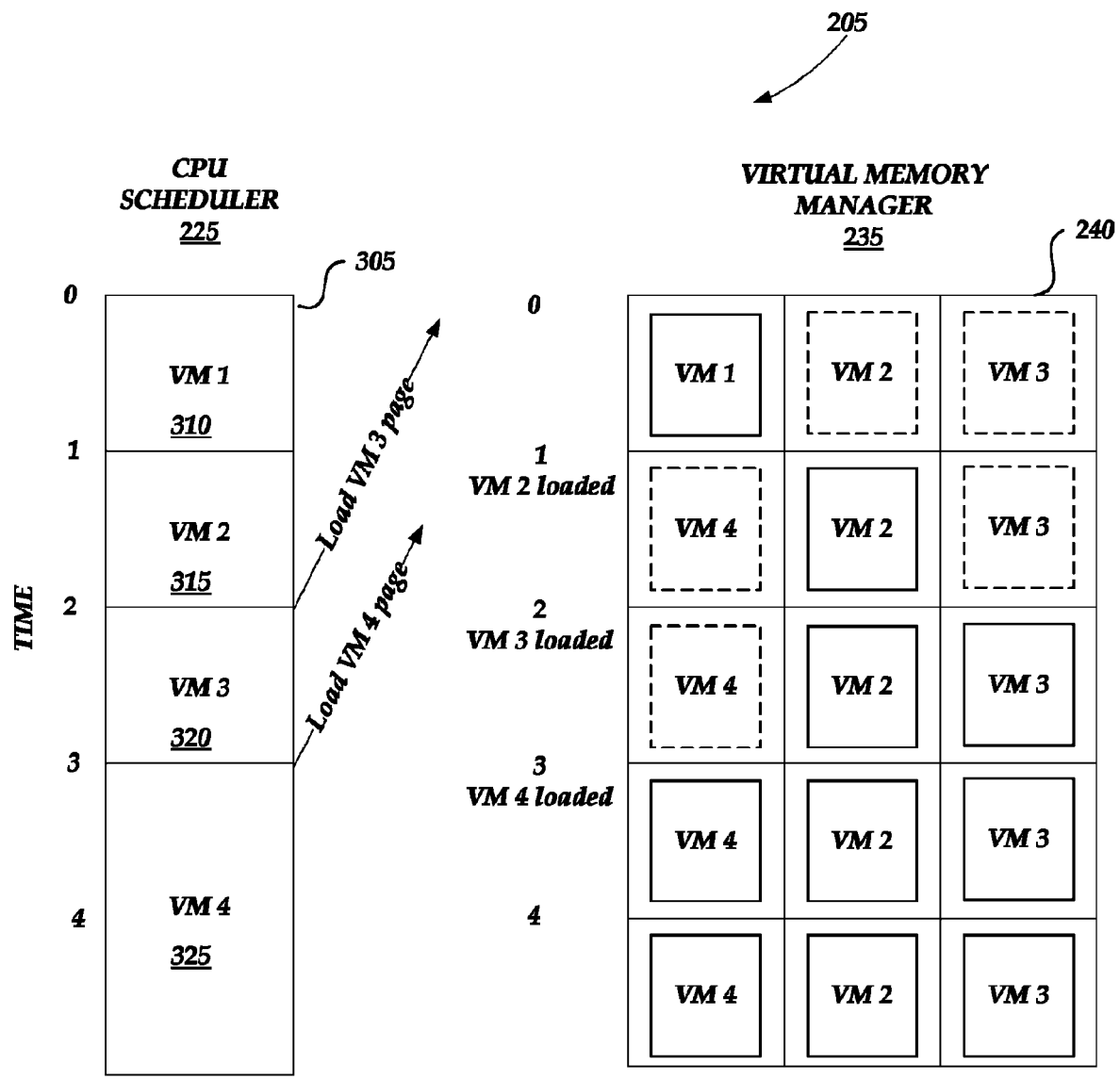
FIG. 3 illustrates an embodiment of the node manager having a CPU scheduler and virtual memory manager in communication with each other in order to facilitate predictive swapping of memory pages in a virtualized environment.

FIG. 3 illustrates an embodiment of the node manager 205 where the CPU scheduler 225 and virtual memory manager 235 are in communication in order to facilitate predictive swapping-in and swapping-out of memory pages in the virtualized environment. In FIG. 3, the CPU scheduler 225 and a scheduling queue 305 are shown. In the illustrated queue 305, there are entries for five time slices at times corresponding to the allocatable times for a CPU resource 230. The virtual machine instances (VMs) are scheduled at the following times: 0—VM1, 1—VM2, 2—VM3, 3—VM4, and 4—VM4. As will be apparent, the time slices can correspond to any amount of time, such as, for example, 10 ns, 100 ns, 1 ms, 10 ms, 100 ms, 1 second, or other increment. The time slices may be identical or may vary. In some embodiments, the CPU scheduler may be managing more than one scheduling queue, for example, where the computing system comprises multiple CPUs.

In FIG. 3, the virtual memory manager 235 manages the page pool 240. The illustrated page pool is shown with available space for 3 pages; however, a page pool can have any number of pages. Loaded pages are indicated in FIG. 3 with solid lines, while pages in the process of loading are indicated by dashed lines. In FIG. 3, pages are assumed to take two time slices to finish loading, reflecting the difference in CPU speeds compared to memory loading speeds. However, the time that a page takes to load depends on the performance characteristics of the secondary storage.

In an example scenario, at time 0, VM1 becomes active and starts running on a CPU resource. Meanwhile, a page corresponding to VM1 has been loaded into the page pool. Pages corresponding to VM2 and VM3 are in the process of loading. The CPU scheduler 225 can provide scheduling information about the upcoming active virtual machine instances to the virtual memory manager 235. For example, the CPU scheduler can notify the virtual memory manager 235 that VM3 is scheduled to be active at time 0. Thus, the virtual memory manager 235 can predicatively swap-in a page corresponding to VM2 at time 0 so that the page is available at time 2. In one embodiment, the CPU scheduler provides scheduling information for a look-ahead time in the future, where the look-ahead time is longer than the time taken to swap a page into memory, thereby giving the virtual memory manager the opportunity to pre-load pages before a virtual machine operates.

At time 1, VM2 becomes active and VM1 inactive. In the page pool, VM2 is now loaded and VM3 is in the process of loading. As, the virtual memory manager 235 has received scheduling information about VM4 going active at time 3, the virtual memory manager 235 begins to pre-load a page associated with VM4. The virtual memory manager 235 selects the page associated to VM1 to be replaced, either through a predictive swapping algorithm or other replacement algorithm. For example, as the virtual memory manager has not received scheduling information about VM1 being active in the future, the virtual memory manager can determine that the page associated with VM1 is not likely needed.

In one embodiment, VM1 may be placed back in the scheduling queue 305 if it needs to run again in the future. The CPU scheduler 225 may provide this scheduling information and/or an estimated run-time or sleep-time, to the virtual memory manager 235. The virtual memory manager 235 can use this information to predict that a page associated with VM1 can safely be swapped out, as it is unlikely to be needed until the VM1's next estimated run-time.

At time 2, VM3 becomes active and VM2 inactive. In the page pool, VM2 and VM3 associated pages are both loaded and the VM4 associated page is loading. The VM3 page is currently being used by VM3, which is active. As the VM2 page is no longer in use, it may be swapped-out, if needed.

At time 3, VM4 becomes active and VM3 inactive. In the page pool, VM2, VM3, and VM4 associated pages are now loaded. As the virtual memory manager 235 has not received scheduling information indicating a virtual machine is going active, the virtual memory manager 235 does not yet need to swap out any memory. However, both the VM2 and VM3 pages may be swapped-out as they are not being used. The virtual memory manager can use its replacement algorithm to determine which page to swap out first.

At time 4, VM4 remains active. In the page pool VM2, VM3, and VM4 associated pages remain loaded. In some embodiments, VM4 associated pages may finish loading at time 4 (e.g. after VM4's scheduled active time). For example, some pages may not be used or requested by a virtual machine immediately and can thus finish loading after the virtual machine begins running.

Memory Hierarchy

Figure 4:
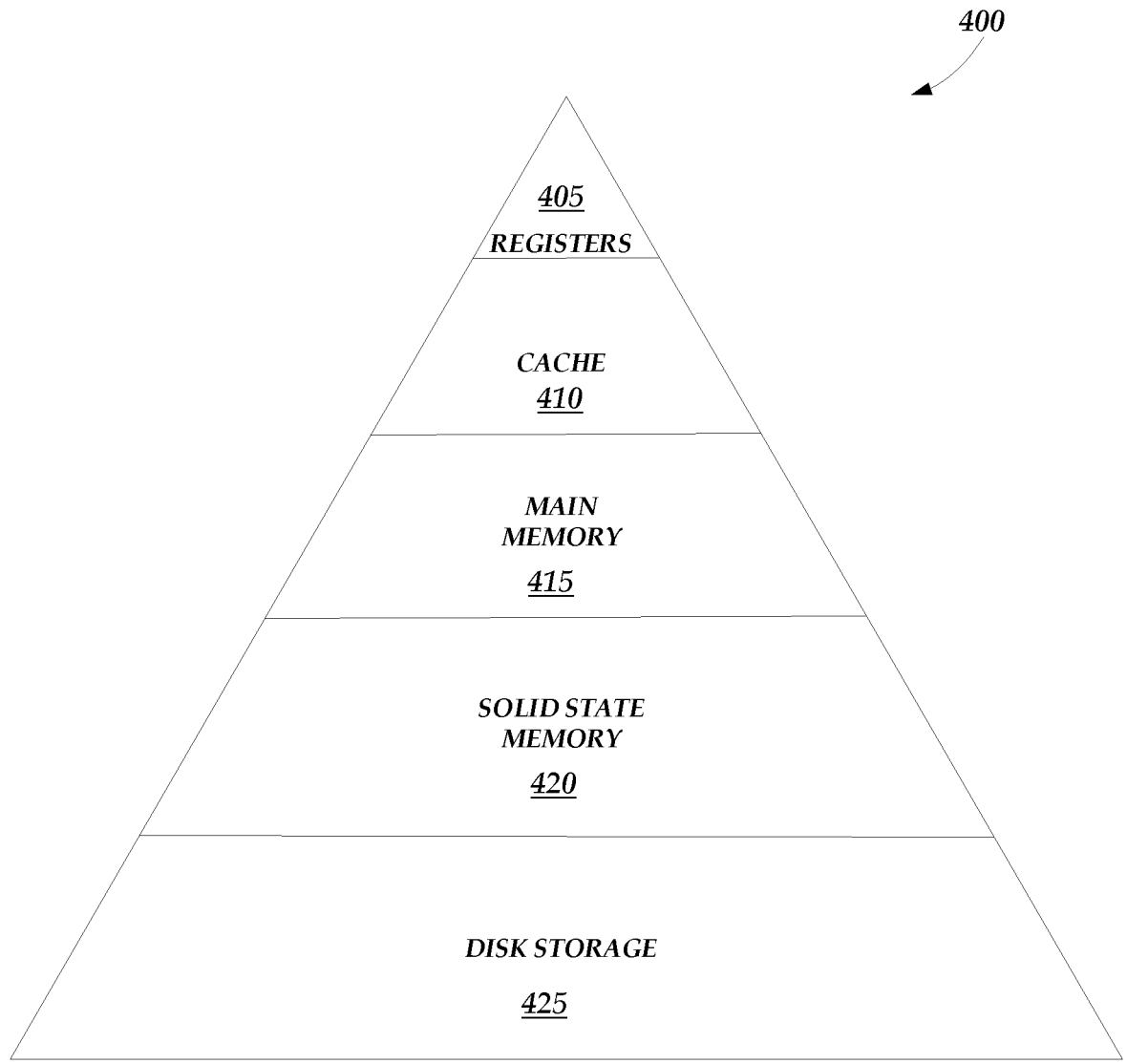
FIG. 4 illustrates a memory hierarchy describing an embodiment of the memory systems available to the virtual memory manager.

FIG. 4 illustrates a memory hierarchy 400 describing an embodiment of the memory systems available to the above virtual memory manager 235. In the illustrated memory hierarchy, faster, smaller memory types are at the top with memory becoming slower and larger as going down the hierarchy. For example, a computing system may have megabytes of very fast cache 410, gigabytes of relatively fast main memory 415, and terabytes of slower disk storage 425. Hard disk latencies are typically in the order of 10s of milliseconds while a typical memory fetch from main memory 415 is in the order or 100s of nanoseconds. The increased latencies could cause significant performance issues if slower memory is accessed often. In the illustrated hierarchy, registers 405 are at the top of the hierarchy, followed by cache 410, main memory 415, solid state memory 420, and then disk storage 425. As will be apparent, other types of memory may also be used.

A solid-state drive (SSD) is a data storage device that uses solid-state memory to store persistent data. SSDs are distinguished from traditional hard disk drives (HDDs), which are electromechanical devices containing spinning disks and movable read/write heads. SSDs, in contrast, use microchips, and usually contain no moving parts. Compared to traditional HDDs, SSDs are typically less susceptible to physical shock, quieter, and have lower access time and latency. Typically, SSDs use the same interface as hard disk drives, thus easily replacing them in most applications. Most SSDs use NAND-based flash memory, which retains memory even without power. SSDs using volatile random-access memory (RAM) also exist for situations which require even faster access, but do not necessarily need data persistence after power loss, or use batteries to back up the data after power is removed. A hybrid drive combines the features of an HDD and an SSD in one unit.

In one embodiment, SSDs are used by the virtual memory manager 235 instead of disk storage. As SSDs generally provide faster performance than electromechanical drives, the overall performance of the memory system can increase. As SSDs provide faster latencies compared to hard drives or other disk storage, the cost of page swapping is reduced. For example, both swapping-in and swapping-out operations from the page pool can benefit from the faster latencies, and/or increased read/write speeds of the SSD. In another embodiment, SSD drives can be used to supplement storage drives, such as if the SSD drives serves as a cache between main memory 420 and disk storage 425. As will be apparent, other types of storage memory can be used to obtain similar benefits. In one embodiment, the storage memory can be any type of memory with similar or faster latencies than SSD (e.g. with latencies equal or above a threshold performance level, such as 10 milliseconds, 1 millisecond, or the latency for an electromechanical drive).

Page Swapping

Figure 5:
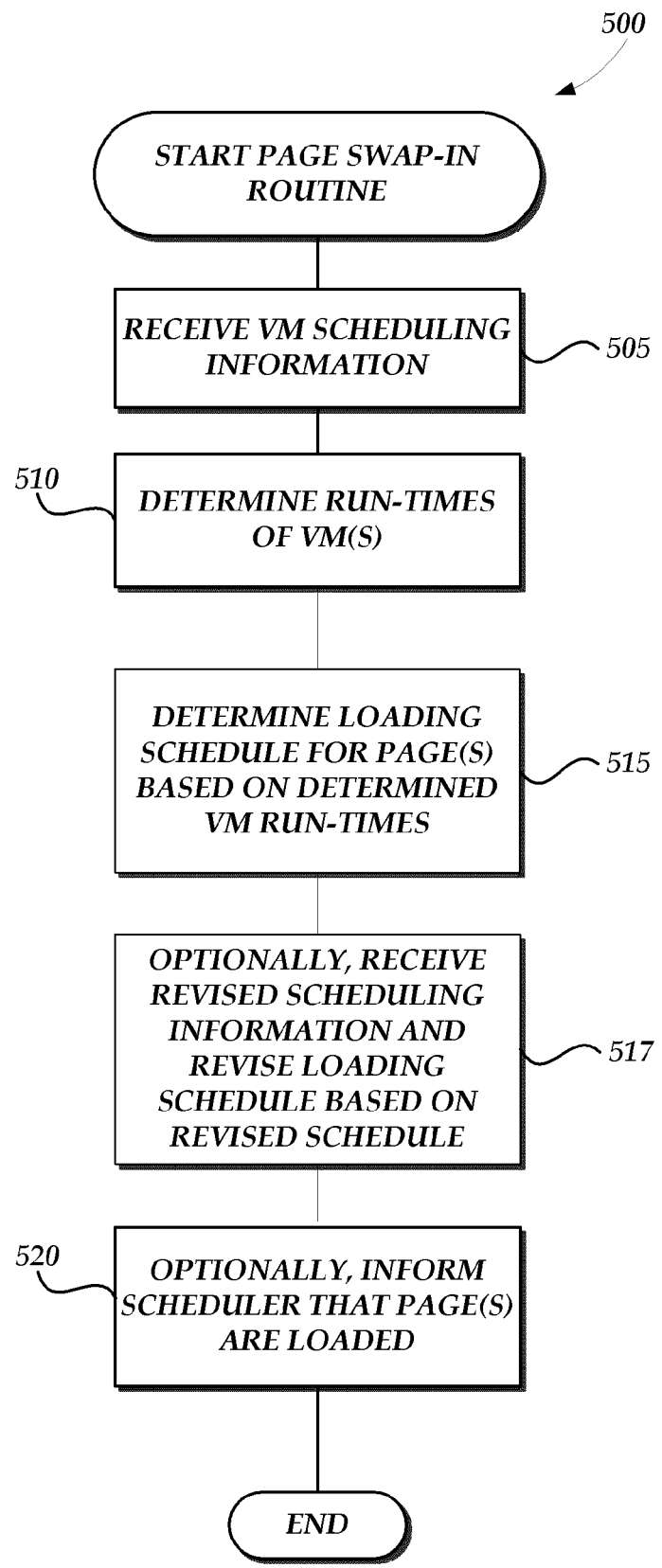
FIG. 5 illustrates a flow-diagram for an embodiment of a page swapping-in process.

FIG. 5 illustrates a flow-diagram for an embodiment of a page swapping-in process 500. For ease of explanation, the process will be described herein as performed by the virtual memory manager (VMM) 235; however, the process may be performed wholly or partially by any other suitable computing device, module or system, such as by the node manager 205 or by components of that system.

Beginning at block 505, the VMM 235 receives scheduling information from the CPU scheduler 225. In one embodiment, when the CPU scheduler adds a virtual machine to the scheduling queue (e.g. due to an interrupt), it determines which VM should get the CPU next. At this point, CPU scheduler notifies the VMM that a particular VM is scheduled to become active.

In some embodiments, the CPU scheduler 225 may send scheduling information on multiple VMs, such as the schedule for a look-ahead time. For example, the scheduling information can include the schedule for the next 10 milliseconds. However, as the time horizon grows, the scheduling information may grow less reliable as VMs may be added or removed from the queue.

Next, at block 510, the VMM 235 determines run-times of one or more VMs. The run-times may be estimated run-times based on the queue. The VMM may determine the run-times from the scheduling information or may receive the run-times from the CPU scheduler.

At block 515, the VMM 235 pre-loads pages based on the VMs scheduled to become active. The VMM can determine if pages that were used by a particular VM are currently swapped out. It then schedules swap-in/reload of those memory pages from SSDs. The VMM may track pages associated with a VM and use that information to identify which pages to swap back in. For example, the VMM can track which memory pages an active VM accesses and use that information to determine which pages to load the next time the VM is active. In one embodiment, the VMM tracks and/or stores the usage pattern of the memory pages by virtual machines. The usage pattern can include information on the times and/or frequency that pages are used, as well other usage data. In one embodiment, the VMM may swap-in only a subset of pages associated with a VM, such as the most recently used pages or pages used more than a predetermined number of times, under the assumption that those pages are the most likely to be used again. In one embodiment, the VMM may load pages in order according to a priority determined from stored usage pattern information, thereby potentially loading pages more likely to be used earlier. In one embodiment, the VMM may schedule pages to begin loading by a predetermined amount of time before an active time for a VM, such as a time equal or greater to the time for reading in a page from storage memory.

At block 515, the VMM 235 optionally receives revised scheduling information or other indication of a change from the CPU scheduler 225 and revises the page loading schedule based on the revised schedule. The VMM can cancel a scheduled page load and/or can reschedule the page loading to a different time based on the revised schedule for the virtual machines. In one embodiment, the CPU scheduler 225 may send a signal or indication to the VMM to cancel or disregard all or a portion of the previous scheduling information provided by the CPU scheduler.

At block 520, the VMM may optionally inform the CPU scheduler 225 that the pages are loaded. In one embodiment, the CPU scheduler may use this information to determine that a VM is ready to become active. The CPU scheduler can then give the CPU to the VM as the pages are now ready. However, the CPU scheduler may use its regular scheduler algorithm without using the page load information.

As the page swapping for a particular virtual machine is done at the virtualization level of the virtualized environment while the virtual machine is inactive, the virtual machine's own internal swapping does not interfere or inhibit the swapping at the virtualization level. Otherwise, the swapping at the virtualization level could potentially cause a page being used by the internal VM swapping to be unavailable when needed by the internal swapping or vice versa, leading to a page fault and possibly forcing the VM to be rescheduled to another time while its requested page is reloaded.

Figure 6:
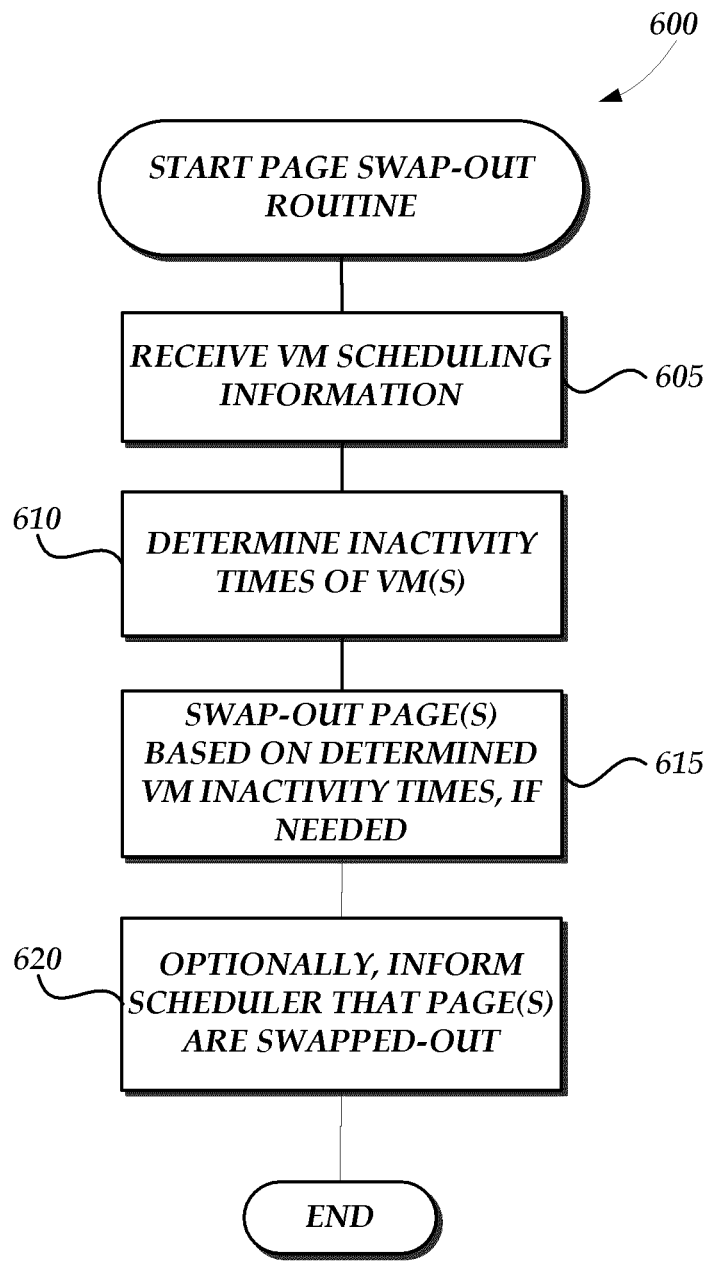
FIG. 6 illustrates a flow-diagram for an embodiment of a page swapping-out process.

FIG. 6 illustrates a flow-diagram for an embodiment of a page swapping-out process 600. For ease of explanation, the process will be described herein as performed by the virtual memory manager (VMM) 235; however, the process may be performed wholly or partially by any other suitable computing device, module or system, such as by the node manager 205 or by components of that system.

Beginning at block 605, the VMM 235 receives VM scheduling information from the CPU scheduler. The scheduling information can include an inactive time for one or more VMs. For example, the CPU scheduler 225 decides to schedule out a VM due to the VM running out of CPU time slice or due to the VM requesting to "sleep" for some period of time. The CPU scheduler can forecast an amount of time that the VM is expected to be scheduled out based on CPU scheduler timeslice granularity and/or peer VM status. In one sample scenario, if there are 10 VMs active on one CPU and the scheduler's timeslice granularity is 10 milliseconds and the VM was scheduled out because it ran out of its timeslice, then the VM is likely to be scheduled out for 100 msecs. As will be apparent, the estimated inactive time can vary depending on the situation.

At block 610, the VMM 235 determines the inactivity times of the one or more VMs. In one embodiment, the inactivity times are received from the CPU scheduler 225. In one embodiment, the VMM 235 estimates the inactivity times based on the scheduling information. The CPU scheduler notifies the VMM that a particular VM has been scheduled out. The CPU scheduler may also provides information about how long it estimates the VM to be scheduled out, for example, based on CPU scheduler time slice forecast or VM sleep request timeout.

At block 615, the VMM 235 swaps out pages based on the determined inactivity times. For example, one or more memory pages associated with a virtual machine with the longest inactive time may be swapped out. As the VM is expected to be swapped out of the CPU for the estimated inactivity time, the pages associated with the CPU are unlikely to be needed until that VM is swapped back in and may thus be swapped out. In one embodiment, the VMM may swap out pages that are not required for a predetermined time, such as 10 nanoseconds, 100 nanoseconds, a time slice, 10 time slices, or other threshold amount of time. In some situations, swapping out may be unnecessary, for example, where the page pool contains free pages. Swapping out can comprise removing the page from memory, designating the page as not in use and/or designating a page for overwriting. At block 620, the VMM 235 may optionally inform the CPU scheduler 225 that the pages are swapped-out from the page pool.

As described above, in some embodiments, as the page swapping for a particular virtual machine is done at the virtualization level of the virtualized environment while the virtual machine is inactive, the virtual machine's own internal swapping does not interfere or inhibit the swapping at the virtualization level.

Depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for allocating resources in a virtualized environment, the system comprising:
   a central processing unit (CPU) scheduler for allocating CPU resources of a physical computing system to a plurality of virtual machine instances, wherein a virtual machine instance is allocated a CPU resource during the instance's active time; and
   a virtual memory manager for allocating memory resources of the physical computing system to the plurality of virtual machine instances, the virtual memory manager configured to:
      receive scheduling information from the CPU scheduler, the scheduling information comprising data on inactive times for each of the plurality of virtual machine instances, wherein the inactive time for each virtual machine instance is based, at least in part, on the active times of the other virtual machine instances on the physical computing system, including a first virtual machine instance;
      identify one or more memory pages associated with the first virtual machine instance wherein the one or more memory pages are maintained in computer memory; and
      schedule unloading of the one or more memory pages associated with the first virtual machine instance from the computer memory based in part on the inactive times for the plurality of virtual machine instances;
   wherein the plurality of virtual machine instances share the CPU resources and memory resources of the physical computing system.

2. The system of claim 1, wherein the virtual memory manager is further configured to notify the CPU scheduler that the one or more pages associated with the first virtual machine are unloaded.

3. The system of claim 2, wherein the CPU scheduler is configured to allocate a CPU resource to a second virtual machine in response to the notification from the virtual memory manager.

4. The system of claim 1, wherein the scheduling information comprises at least one of an order of operation, an estimated run-time, an estimated sleep time, and an estimated end time.

5. The system of claim 4, wherein the virtual memory manager determines when a memory page is available for swapping out based on the estimated end time of the virtual machine instance associated with the memory page.

6. The system of claim 1, further comprising storage memory having a read time at least equal to a threshold performance latency, wherein pages swapped out of the memory are stored on the storage memory.

7. The system of claim 1, wherein the virtual memory manager is further configured to cancel a scheduled loading of one or more memory pages associated with the first virtual machine instance after receiving an indication from the CPU scheduler of a change in a scheduled active time for the first virtual machine instance.

8. The system of claim 7, wherein the virtual memory manager is further configured to re-schedule loading of the one or more memory pages associated with the first virtual machine instance after receiving the indication from the CPU scheduler, the indication comprising a new active time for the first virtual machine instance.

9. The system of claim 1, wherein the virtual memory manager is further configured to swap out one or more memory pages based on active times for the one or more virtual machine instances.

10. The system of claim 1, wherein one or more memory pages are scheduled to be loaded before the first virtual machine instance is active.

11. A method for unloading memory pages in a virtualized environment, the method comprising:
   by a computer system comprising computer hardware:
      determining an inactive time during which a first virtual machine instance of a plurality of virtual machine instances is deallocated a central processing unit (CPU) resource relative to the other virtual machine instances based on CPU scheduling information;
      identifying one or more memory pages associated with the first virtual machine instance wherein the one or more memory pages are maintained in computer memory; and
      unloading the one or more memory pages associated with the first virtual machine instance from computer memory based in part on the determined inactive time.

12. The method of claim 11, further comprising:
   in response to disassociation of the virtual machine from a CPU, swapping out the one or more memory pages associated with the virtual machine when the virtual machine is not scheduled to run for at least a predetermined length of time.

13. The method of claim 12 wherein the predetermined length of time comprises a sleep request timeout.

14. The method of claim 12, wherein the predetermined length of time comprises an expected time for the virtual machine to be scheduled out.

15. The method of claim 11, wherein the scheduling information comprises at least one of an order of operation, an estimated run-time, an estimated sleep time, and an estimated end time.

16. The method of claim 11, wherein the one or more memory pages are maintained by a node manager that manages one or more virtual machine instances.

17. The method of claim 16, wherein the node manager comprises a hypervisor.

18. The method of claim 16, wherein the node manager comprises a first guest operating system for managing other guest operating systems.

19. The method of claim 11, wherein the one or more memory pages are loaded from storage memory having a read time at least equal to a threshold performance latency.

20. The method of claim 11, wherein the one or more pages are unloaded for a predetermined amount of time.

21. The method of claim 11, further comprising:
   obtaining information about memory pages accessed by a second virtual machine during a previous active time;
   determining the one or more memory pages associated with the second virtual machine to load based on the obtained information; and
   loading the one or more memory pages associated with the second virtual machine.

22. The method of claim 21, wherein loading the one or more memory pages associated with the second virtual machine further comprises:
   loading the one or more memory pages in order based on a priority determined from the information about the memory pages.

23. The method of claim 21, wherein the one or more memory pages associated with the second virtual machine complete loading after the second virtual machine is active.

24. The method of claim 21, wherein the one or more memory pages associated with the second virtual machine complete loading before the second virtual machine instance is active.

25. A method for managing memory resources in a virtualized environment, the method comprising:
by a computer system comprising computer hardware:
determining an estimated inactive time for each of a plurality of virtual machine instances based on central processing unit (CPU) scheduling information, where each of the plurality of virtual machine instances has one or more associated memory pages in paged pool memory;
determining one or more memory pages to swap out from the paged pool memory based on a comparison of estimated inactive times for the plurality of virtual machine instances; and
swapping out the one or more memory pages from the paged pool memory.

26. The method of claim 25, wherein the one or more memory pages swapped out are associated with one of the plurality of virtual machine instances having the longest inactive time.

27. The method of claim 25, further comprising providing notification to a CPU scheduler that the one or more pages associated with one of the virtual machine instances have been removed from the page pool.

28. The method of claim 25, wherein at least one of the plurality of virtual machine instances becomes inactive due to a page fault.

29. The method of claim 25, further comprising storing usage patterns of the one or more memory pages by the associated virtual machine.

30. A non-transitory computer-readable storage medium having stored thereon instructions that, when executed, direct a computing system to perform operations comprising:
determining an estimated inactive time for each of a plurality of virtual machine instances relative to the other virtual machine instances based on processor scheduling information; and
deallocating memory resources of the computing system storing data associated with the plurality of virtual machine instances based in part on the determined inactive times;
wherein the plurality of virtual machine instances share processing resources and memory resources of the computing system.

31. The non-transitory computer-readable storage medium of claim 30, wherein the instructions further direct the computing system to perform operations comprising:
identifying one or more memory pages associated with a first virtual machine; and
pre-loading the one or more memory pages associated with the first virtual machine into memory, wherein the one or more memory pages are loaded before requested by the first virtual machine.

32. The non-transitory computer-readable storage medium of claim 30, wherein determining an inactive time comprises receiving a signal that the first virtual machine is scheduled to be deallocated from a processor.

33. The non-transitory computer-readable storage medium of claim 30, wherein the scheduling information comprises at least one of an order of operation, an estimated run-time, an estimated sleep time, and an estimated end time.

\* \* \* \* \*